(12) United States Patent
Oyobe et al.

(10) Patent No.: US 7,609,022 B2
(45) Date of Patent: Oct. 27, 2009

(54) POWER SUPPLY SYSTEM FOR VEHICLE WITH IMPROVED ENERGY EFFICIENCY AND VEHICLE INCLUDING THE SAME

(75) Inventors: Hichirosai Oyobe, Toyota (JP);
Tetsuhiro Ishikawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 211 days.

(21) Appl. No.: 11/547,255

(22) PCT Filed: Mar. 1, 2005

(86) PCT No.: PCT/JP2005/003840

§ 371 (c)(1),
(2), (4) Date: Oct. 3, 2006

(87) PCT Pub. No.: WO2005/105511

PCT Pub. Date: Nov. 10, 2005

(65) Prior Publication Data

US 2007/0274109 A1    Nov. 29, 2007

(30) Foreign Application Priority Data

Apr. 28, 2004    (JP) .............................. 2004-134172

(51) Int. Cl.
*H02P 27/04* (2006.01)
(52) U.S. Cl. ...................... 318/800; 318/148; 318/801; 363/34; 363/37
(58) Field of Classification Search ................ 318/139, 318/148, 442, 153, 154, 158, 800, 801, 812, 318/432, 434; 363/34, 37
See application file for complete search history.

(56) References Cited

U.S. PATENT DOCUMENTS 5,589,743 A * 12/1996 King ........................... 318/139

(Continued)

FOREIGN PATENT DOCUMENTS

EP    1 167 110 A2    1/2002

(Continued)

OTHER PUBLICATIONS

W. Hofmann et al., "Automatic Gearbox Continiuously Controlled by Electromagnetic and Electronic Power Converter", Power Electronics Specialists Conference, vol. 1, pp. 521-526, Jun. 2000.

(Continued)

*Primary Examiner*—Bentsu Ro
*Assistant Examiner*—Antony M Paul
(74) *Attorney, Agent, or Firm*—Oliff & Berridge, PLC

(57) ABSTRACT

A matrix converter (38) converts three-phase AC power input from a first motor-generator (MG1) directly to three-phase AC power for driving a second motor-generator (MG2) and outputs the resultant three-phase AC power, without rectifying the three-phase AC power generated by the first motor-generator (MG1) once to DC power as in an example using a conventional three-phase full-wave rectification inverter. In a power supply system for a vehicle (14), the three-phase AC power is transmitted and received between two motor-generators (MG1, MG2) more directly, by means of the matrix converter (38). Therefore, power loss can be reduced, as compared with a conventional example in which the three-phase AC power is once converted to DC power. Thus, a power supply system for a vehicle with improved energy efficiency and a vehicle including the same can be provided.

16 Claims, 6 Drawing Sheets

U.S. PATENT DOCUMENTS

| | | | |
|---|---|---|---|
| 5,669,470 A | 9/1997 | Ross | |
| 6,198,238 B1* | 3/2001 | Edelson | 318/148 |
| 6,459,606 B1* | 10/2002 | Jadric | 363/163 |
| 6,492,785 B1 | 12/2002 | Kasten et al. | |
| 6,496,343 B2* | 12/2002 | Mahlein et al. | 361/91.1 |
| 6,636,693 B2* | 10/2003 | Blasko | 388/800 |
| 6,704,182 B2* | 3/2004 | Bruckmann et al. | 361/91.1 |
| 6,862,163 B2* | 3/2005 | Schierling et al. | 361/92 |
| 6,900,998 B2* | 5/2005 | Erickson et al. | 363/159 |
| 7,084,524 B2* | 8/2006 | Lacaze et al. | 307/3 |
| 7,269,037 B2* | 9/2007 | Marquardt | 363/71 |
| 2001/0021116 A1* | 9/2001 | Bruckmann et al. | 363/157 |
| 2002/0135234 A1* | 9/2002 | Chekhet et al. | 307/82 |
| 2003/0146726 A1 | 8/2003 | Ishikawa et al. | |
| 2006/0152180 A1* | 7/2006 | Tahara et al. | 318/139 |

FOREIGN PATENT DOCUMENTS

| | | |
|---|---|---|
| JP | A-10-191501 | 7/1998 |
| JP | A 2000-278808 | 10/2000 |
| JP | A-2001-329884 | 11/2001 |
| JP | A 2002-534050 | 10/2002 |
| JP | A 2002-374604 | 12/2002 |
| JP | A-2003-235105 | 8/2003 |
| JP | A-2003-244960 | 8/2003 |
| JP | A-2003-309975 | 10/2003 |
| RU | 2259283 | 8/2005 |
| SU | 1684106 A1 | 10/1991 |
| WO | WO 02/43235 A2 | 5/2002 |

OTHER PUBLICATIONS

Patrick W. Wheeler et al., "Matrix Converters: A Technology Review", IEEE Transactions on Industrial Electronics, vol. 49, No. 2, pp. 276-288, Apr. 2002.

R. Michael Friends et al., "Comparison of the Matrix and DC-link Converter Topologies in a Hybrid Electric Vehicle", SAE2003-01-2309, SAE International, Costa Mesa, California, U.S.A., Jun. 23-25, 2003.

* cited by examiner

POWER SUPPLY SYSTEM FOR VEHICLE WITH IMPROVED ENERGY EFFICIENCY AND VEHICLE INCLUDING THE SAME

TECHNICAL FIELD

The present invention relates to a power supply system for a vehicle and a vehicle including the same, and more particularly to a power supply system for a vehicle employing a matrix converter performing AC (alternate current)-AC conversion as well as a vehicle including the same.

BACKGROUND ART

With growing interest in energy saving and environmental issues in recent days as a backdrop, much attention has been paid to a hybrid vehicle. The hybrid vehicle has already been put into practical use and commercially available.

The hybrid vehicle is a vehicle having a DC (direct current) power supply, an inverter, and a motor driven by the inverter as a power source, in addition to an engine serving as a conventional internal combustion engine. That is, the hybrid vehicle obtains the mechanical power source not only by driving the engine but also by converting a DC voltage from a DC power supply to an AC voltage using an inverter, so as to rotate the motor with the resultant AC voltage.

Japanese Patent Laying-Open No. 2002-374604 discloses an example of a configuration of such a hybrid vehicle. According to this configuration, the hybrid vehicle includes a motor-generator for power generation and a motor-generator for driving. The motor-generator for power generation generates electric power using a portion of mechanical power generated from the engine, and the generated electric power is in turn used in the motor-generator for driving. Wheels receive the mechanical power from the engine and the motor-generator for driving, and rotate.

In the hybrid vehicle, there is a need to utilize the power generated by the on-vehicle motor-generator for power generation as commercial power supply. That is, the hybrid vehicle is utilized as the commercial power supply when commercial power supply facilities are not available in the vicinity such as in camping or when power failure occurs.

On the other hand, there is also a need to supply the hybrid vehicle with electric power from an external commercial power supply. That is, though electric power can be generated by the generator using the mechanical power from the engine, a battery serving as a DC power supply is charged by the external commercial power supply so as to allow use of an electrical appliance in the vehicle without operating the engine.

Japanese Patent Laying-Open Nos. 2002-374604 and 2000-278808 disclose a vehicle including a socket outlet for AC 100V. In addition, documents in the following also show the background art: Japanese Patent National Publication No. 2002-534050; and Patrick W. Wheeler et al., "Matrix Converters: A Technology Review", IEEE TRANSACTIONS ON INDUSTRIAL ELECTRONICS, April, 2002, Vol. 49, No. 2, pp. 276-288.

FIG. 9 illustrates energy transmission in a conventional hybrid vehicle.

Referring to FIG. 9, the conventional hybrid vehicle includes an engine 502, a motor-generator MG1, an inverter 537 connected to motor-generator MG1, a motor-generator MG2, and an inverter 536 connected to motor-generator MG2.

The hybrid vehicle further includes a battery 512, a capacitor C501 stabilizing a voltage applied to opposing ends of the battery, a planetary gear 516 connected to engine 502 and motor-generators MG1, MG2, and a tire 520 driven by planetary gear 516.

Planetary gear 516 is connected to motor-generators MG1, MG2 and engine 502, and serves as a power split device dividing the mechanical power among these three components.

As shown in FIG. 9, in a normal running state, though energy generated from rotation of engine 502 is partially transmitted for driving the tire as shown with an arrow P3, the energy is mostly used for rotating motor-generator MG1 as shown with an arrow P1 so as to generate power.

Three-phase AC power generated by motor-generator MG1 is once converted to DC power by inverter 537. The DC power output from inverter 537 is stored in battery 512 or capacitor C501. Meanwhile, inverter 536 receives the DC power from battery 512 and capacitor C501 and drives motor-generator MG2. The rotation energy from motor-generator MG2 drives tire 520 as shown with an arrow P2.

In other words, in the conventional hybrid vehicle, most energy is transmitted from the engine to motor-generator MG1. Then, the generated power is converted from AC to DC and converted again from DC to AC by inverter 536, and finally converted to mechanical power in motor-generator MG2.

In this manner, a path to transmit the power from motor-generator MG1 through inverters 537, 536 to motor-generator MG2 passes through the inverter twice, which results in poor power conversion efficiency. In addition, when the power generated by motor-generator MG1 is converted to DC by inverter 537, the power is once stored in battery 512 or capacitor C501, in which case, life of the battery and need for a relatively large capacitor are matters of concern.

Moreover, Japanese Patent Laying-Open No. 2002-374604 provides an additional power converter dedicated for AC 100V in order to output AC 100V from the vehicle. That is, there is a disadvantage that the dedicated power converter should additionally be provided in order to output the commercial power supply of AC 100V from the hybrid vehicle.

DISCLOSURE OF THE INVENTION

An object of the present invention is to provide a power supply system for a vehicle with improved energy efficiency and a vehicle including the same.

In summary, a power supply system for a vehicle according to the present invention includes: a first rotating electric machine capable of generating first m-phase AC power upon receiving mechanical power from an internal combustion engine, where m represents a natural number not smaller than 3; a second rotating electric machine driving a wheel upon receiving second m-phase AC power equal to the first m-phase AC power in the number of phases; and a matrix converter converting the first m-phase AC power and outputting resultant AC power as at least a portion of the second m-phase AC power. The matrix converter includes m×m switching elements connected between each of m-phase outputs of the first rotating electric machine and each of m-phase inputs of the second rotating electric machine.

Preferably, the power supply system for a vehicle further includes a battery, and an inverter converting DC power obtained from the battery and outputting the resultant power as at least a portion of the second m-phase AC power.

More preferably, the power supply system for a vehicle further includes a first switch electrically connecting the battery to the inverter, and a control unit controlling power conversion by the matrix converter and controlling opening and closing of the first switch in association with a state of power conversion by the matrix converter.

More preferably, the power supply system for a vehicle further includes a control unit controlling power conversion by the matrix converter and controlling the inverter in association with a state of power conversion by the matrix converter.

Preferably, the switching element includes a reverse-blocking-type insulated gate bipolar transistor.

Preferably, the power supply system for a vehicle further includes a second switch electrically connecting the matrix converter to the second rotating electric machine, and a socket connected between the second switch and the matrix converter and outputting single-phase AC power.

Preferably, the power supply system for a vehicle further includes a third switch electrically connecting the matrix converter to the first rotating electric machine, and a socket connected between the third switch and the matrix converter and receiving single-phase AC power from outside of the vehicle.

A vehicle according to another aspect of the present invention includes a power supply system for a vehicle. The power supply system for a vehicle includes: a first rotating electric machine capable of generating first m-phase AC power upon receiving mechanical power from an internal combustion engine, where m represents a natural number not smaller than 3; a second rotating electric machine driving a wheel upon receiving second m-phase AC power equal to the first m-phase AC power in the number of phases; and a matrix converter converting the first m-phase AC power and outputting resultant AC power as at least a portion of the second m-phase AC power. The matrix converter includes m×m switching elements connected between each of m-phase outputs of the first rotating electric machine and each of m-phase inputs of the second rotating electric machine.

Preferably, the power supply system for a vehicle further includes a battery, and an inverter converting DC power obtained from the battery and outputting the resultant power as at least a portion of the second m-phase AC power.

More preferably, the power supply system for a vehicle further includes a first switch electrically connecting the battery to the inverter, and a control unit controlling power conversion by the matrix converter and controlling opening and closing of the first switch in association with a state of power conversion by the matrix converter.

More preferably, the power supply system for a vehicle further includes a control unit controlling power conversion by the matrix converter and controlling the inverter in association with a state of power conversion by the matrix converter.

Preferably, the switching element includes a reverse-blocking-type insulated gate bipolar transistor.

Preferably, the power supply system for a vehicle further includes a second switch electrically connecting the matrix converter to the second rotating electric machine, and a socket connected between the second switch and the matrix converter and outputting single-phase AC power.

Preferably, the power supply system for a vehicle further includes a third switch electrically connecting the matrix converter to the first rotating electric machine, and a socket connected between the third switch and the matrix converter and receiving single-phase AC power from outside of a vehicle.

Therefore, a primary advantage of the present invention is that power loss can be reduced because transmission and reception of the power between two rotating electric machines is more direct.

In addition, another advantage of the present invention is that the vehicle can have a smaller size because the dedicated power converter is not necessary.

BEST MODES FOR CARRYING OUT THE INVENTION

Figure 1:
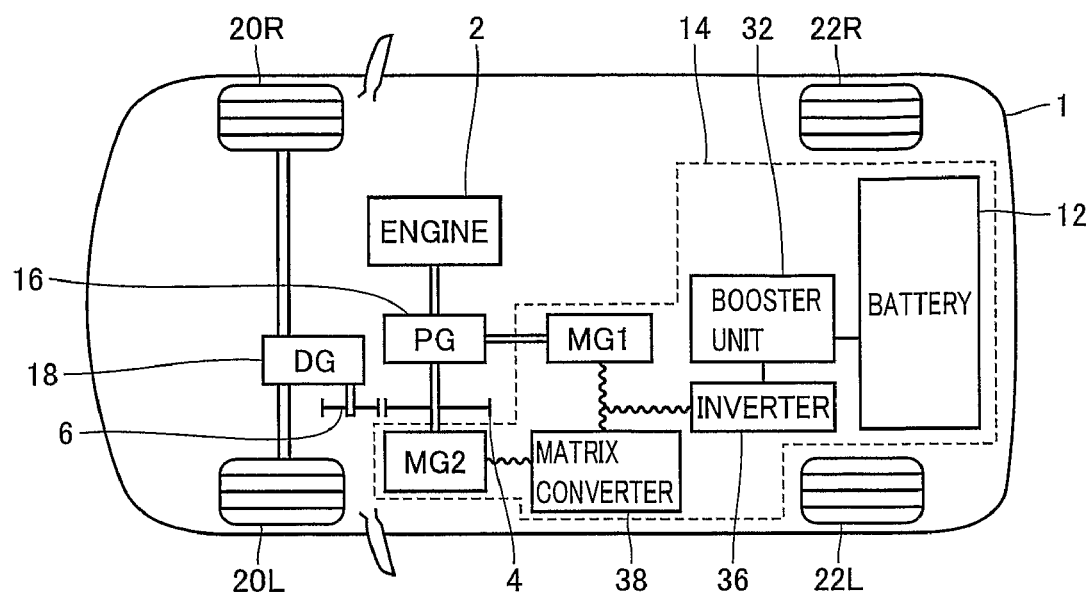
FIG. 1 is a schematic diagram showing a configuration of a hybrid vehicle 1 according to a first embodiment.

Embodiments of the present invention will be described hereinafter in detail with reference to the drawings. The same elements have the same reference characters allotted. Therefore, detailed description thereof will not be repeated.

First Embodiment

FIG. 1 is a schematic diagram showing a configuration of a hybrid vehicle 1 according to a first embodiment.

Referring to FIG. 1, hybrid vehicle 1 includes front wheels 20R, 20L, rear wheels 22R, 22L, an engine 2, a planetary gear 16, a power supply system for a vehicle 14, a differential gear 18, and gears 4, 6.

Power supply system for a vehicle 14 includes a battery 12 disposed in the rear of the vehicle, a booster unit 32 boosting DC power output from battery 12, an inverter 36 transmitting/receiving the DC power to/from booster unit 32, motor-generator MG1 generating power upon receiving the mechanical power of engine 2 through planetary gear 16, motor-generator MG2 having a rotation shaft connected to planetary gear 16, and a matrix converter 38 connected to motor-generators MG1, MG2 and inverter 36 and performing AC-AC conversion.

Planetary gear 16 has first to third rotation shafts. The first rotation shaft is connected to engine 2, the second rotation shaft is connected to motor-generator MG1, and the third rotation shaft is connected to motor-generator MG2.

Gear 4 is attached to the third rotation shaft, and gear 4 transmits the mechanical power to differential gear 18 by driving gear 6. Differential gear 18 transmits the mechanical power received from gear 6 to front wheels 20R, 20L and transmits the rotation power of front wheels 20R, 20L to the third rotation shaft of the planetary gear through gears 6 and 4.

Planetary gear 16 serves to divide the mechanical power among engine 2 and motor-generators MG1, MG2. That is, if rotation of two rotation shafts out of the three rotation shafts of planetary gear 16 is set, rotation of one remaining rotation shaft is automatically set. Therefore, while engine 2 is operated in a range attaining highest efficiency, an amount of power generation from motor-generator MG1 is controlled and motor-generator MG2 is driven. The vehicle speed is thus controlled and a vehicle attaining high energy efficiency as a whole is realized.

Battery 12 serving as the DC power supply is implemented, for example, by a secondary battery such as a nickel metal hydride battery or a lithium-ion battery. Battery 12 supplies booster unit 32 with the DC power and it is charged by the DC power from booster unit 32.

Booster unit 32 boosts a DC voltage received from battery 12, and supplies the boosted DC voltage to inverter 36. Inverter 36 converts the supplied DC voltage to an AC voltage, and controls drive of motor-generator MG1 at the time of start of the engine. After the engine is started, the AC power generated by motor-generator MG1 is converted to DC by inverter 36 and then to a voltage suitable for charging battery 12 by booster unit 32, whereby battery 12 is charged.

The three-phase AC power generated by MG1 is transmitted to motor-generator MG2 through matrix converter 38. Motor-generator MG2 assists engine 2 in driving front wheels 20R, 20L.

Figure 2:
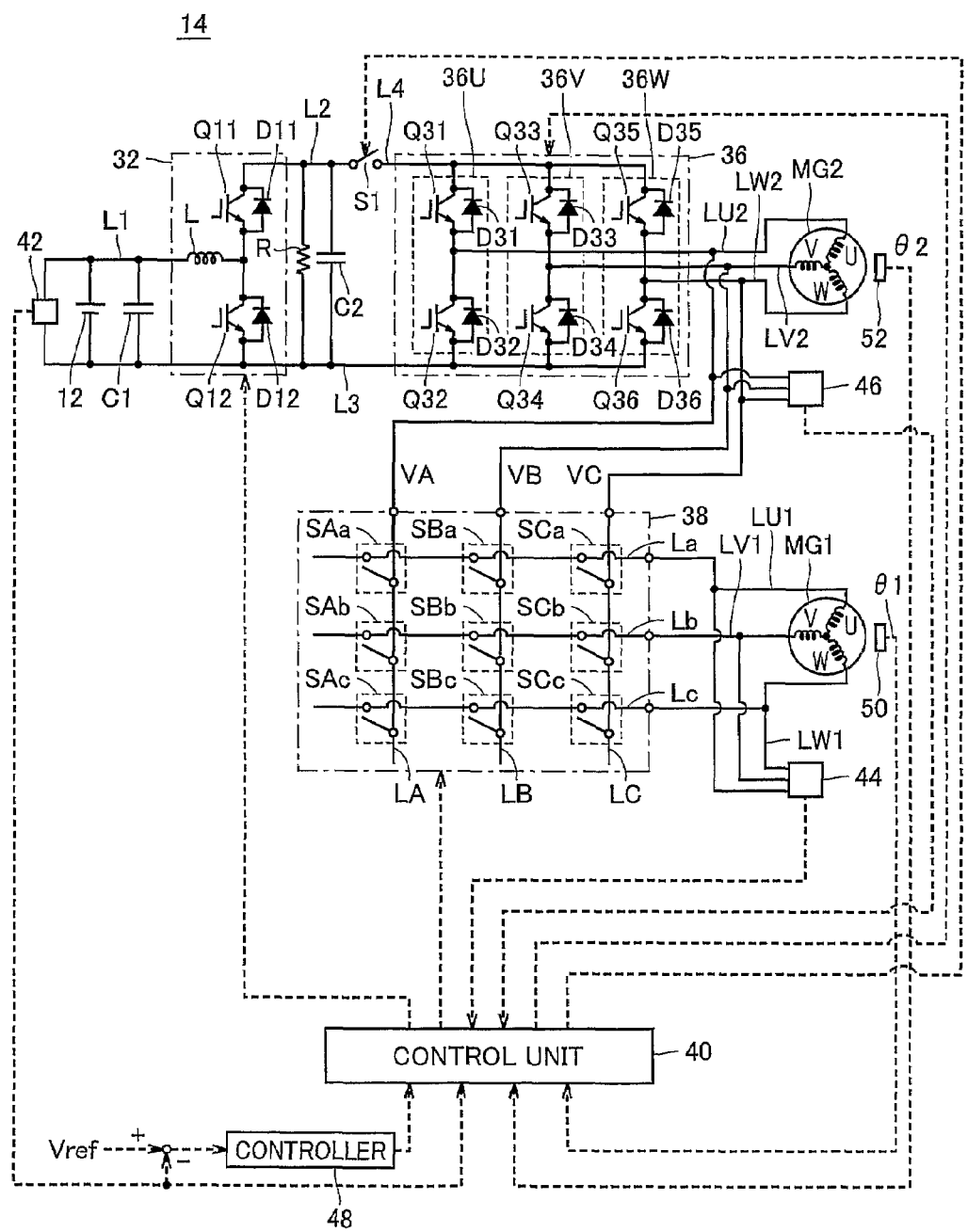
FIG. 2 is a circuit diagram showing a configuration of a power supply system for a vehicle 14 in FIG. 1.

FIG. 2 is a circuit diagram showing a configuration of power supply system for a vehicle 14 in FIG. 1.

Referring to FIG. 2, power supply system for a vehicle 14 includes booster unit 32, inverter 36, matrix converter 38, a control unit 40, voltage sensors 42 to 46, a controller 48, capacitors C1, C2, a resistor R, power supply lines L1, L2, L4, a switch S1, a ground line L3, U-phase lines LU1, LU2, V-phase lines LV1, LV2, and W-phase lines LW1, LW2.

Motor-generator MG1 serves as a three-phase AC synchronous motor-generator, and it is connected to U-phase, V-phase and W-phase lines LU1, LV1 and LW1. When engine 2 is started, motor-generator MG1 generates driving force with the AC power received from U-phase, V-phase and W-phase lines LU1, LV1 and LW1. After engine 2 is started, motor-generator MG1 receives the mechanical power from engine 2 in FIG. 1 through planetary gear 16 and converts the mechanical power to the AC power. Then, motor-generator MG1 outputs the obtained AC power to U-phase, V-phase and W-phase lines LU1, LV1 and LW1.

Motor-generator MG2 serves as a three-phase AC synchronous motor, and it is connected to U-phase, V-phase and W-phase lines LU2, LV2 and LW2. Motor-generator MG2 generates driving force with the AC power received from U-phase, V-phase and W-phase lines LU2, LV2 and LW2. Motor-generator MG2 carries out regenerative braking in deceleration. That is, motor-generator MG2 converts the mechanical power from the tire to electric power and outputs the electric power to U-phase, V-phase and W-phase lines LU2, LV2 and LW2.

It is noted that motor-generators MG1 and MG2 include rotational position sensors 50 and 52 for detecting a rotational position thereof respectively.

Booster unit 32 includes IGBT elements Q11, Q12, diodes D11, D12, and a reactor L.

IGBT elements Q11, Q12 are connected in series between power supply line L2 and ground line L3, and receive a control signal from control unit 40 at each gate. Diode D11 is connected between the collector and the emitter of IGBT element Q11 such that a direction from the emitter to the collector is a forward direction. Diode D12 is connected between the collector and the emitter of IGBT element Q12 such that a direction from the emitter to the collector is a forward direction.

Power supply line L1 is connected to a plus electrode of battery 12. Reactor L has one end connected to power supply line L1. Reactor L has the other end connected to the emitter of IGBT element Q11 and the collector of IGBT element Q12.

Reactor L stores a current flowing through a coil in accordance with a switching operation of IGBT element Q12 as magnetic energy, so as to boost the DC voltage from battery 12. The boosted DC voltage is supplied to power supply line L2 through diode D11 in synchronization with a timing of turn-off of IGBT element Q12.

In this manner, booster unit 32 boosts the DC voltage received from battery 12 based on the control signal from control unit 40, and supplies the boosted voltage to power supply line L2. On the other hand, booster unit 32 lowers the DC voltage received from inverter 36 to a level suitable for a charging voltage, in order to charge battery 12.

Capacitor C1 is connected between power supply line L1 and ground line L3, and reduces an influence on battery 12 and booster unit 32 originating from voltage fluctuation.

Switch S1 is connected between power supply line L4 and power supply line L2, and connection/disconnection of switch S1 is controlled by control unit 40.

Inverter 36 includes a U-phase arm 36U, a V-phase arm 36V, and a W-phase arm 36W connected in parallel between power supply line L4 and ground line L3.

U-phase arm 36U includes IGBT elements Q31, Q32 connected in series between power supply line L4 and ground line L3, a diode D31 connected in parallel such that a direction from the emitter to the collector of IGBT element Q31 is a forward direction, and a diode D32 connected in parallel such that a direction from the emitter to the collector of IGBT element Q32 is a forward direction.

V-phase arm 36V includes IGBT elements Q33, Q34 connected in series between power supply line L4 and ground line L3, a diode D33 connected in parallel such that a direction from the emitter to the collector of IGBT element Q33 is a forward direction, and a diode D34 connected in parallel such that a direction from the emitter to the collector of IGBT element Q34 is a forward direction.

W-phase arm 36W includes IGBT elements Q35, Q36 connected in series between power supply line L4 and ground line L3, a diode D35 connected in parallel such that a direction from the emitter to the collector of IGBT element Q35 is a forward direction, and a diode D36 connected in parallel such that a direction from the emitter to the collector of IGBT element Q36 is a forward direction.

Line LU2 is connected between a junction point of IGBT elements Q31, Q32 of U-phase arm 36U and one end of a U-phase coil of motor-generator MG2. Line LV2 is connected between a junction point of IGBT elements Q33, Q34 of V-phase arm 36V and one end of a V-phase coil of motor-generator MG2. Line LW2 is connected between a junction point of IGBT elements Q35, Q36 of W-phase arm 36W and one end of a W-phase coil of motor-generator MG2. The other ends of the U-phase, V-phase, and W-phase coils of motor-generator MG2 are all coupled to a neutral point.

Inverter 36 converts the DC power received from power supply line L4 to the AC power based on the control signal from control unit 40, and outputs the AC power to U-phase, V-phase and W-phase lines LU2, LV2 and LW2.

Capacitor C2 is connected between power supply line L2 and ground line L3, and reduces an influence on inverter 36 and booster unit 32 originating from voltage fluctuation. Resistor R serves as a discharging resistor connected between power supply line L2 and ground line L3.

Matrix converter 38 includes bidirectional switching elements SAa to SAc, SBa to SBc and SCa to SCc, and power supply lines LA to LC and La to Lc.

Power supply lines LA to LC are connected to U-phase line LU2, V-phase line LV2 and W-phase line LW2 of inverter 36 respectively. Power supply lines La to Lc are connected to U-phase line LU1, V-phase line LV1 and W-phase line LW1 connected to motor-generator MG1 respectively.

In other words, matrix converter 38 includes 3×3 switching elements SAa to SAc, SBa to SBc and SCa to SCc connected between power supply lines La to Lc serving as three-phase outputs of motor-generator MG1 and power supply lines LA to LC serving as three-phase inputs of motor-generator MG2 respectively.

More specifically, nine bidirectional switching elements SAa to SAc, SBa to SBc and SCa to SCc are arranged in matrix of three rows and three columns. Bidirectional switching element SAa is connected between power supply line LA and power supply line La. Bidirectional switching element SBa is connected between power supply line LB and power supply line La. Bidirectional switching element SCa is connected between power supply line LC and power supply line La.

Bidirectional switching element SAb is connected between power supply line LA and power supply line Lb. Bidirectional switching element SBb is connected between power supply line LB and power supply line Lb. Bidirectional switching element SCb is connected between power supply line LC and power supply line Lb.

Bidirectional switching element SAc is connected between power supply line LA and power supply line Lc. Bidirectional switching element SBc is connected between power supply line LB and power supply line Lc. Bidirectional switching element SCc is connected between power supply line LC and power supply line Lc.

Each of the bidirectional switching elements carries out a switching operation in response to a control instruction from control unit 40. When the bidirectional switching element is turned on, bidirectional current flow between two corresponding power supply lines is allowed. In addition, when each of the bidirectional switching elements is turned off, it electrically isolates the two corresponding power supply lines from each other.

The matrix converter serves as a power converter performing direct power conversion from AC to AC having a different frequency. By exerting PWM control using the bidirectional switch, sinusoidal AC power having any frequency can be generated.

As to characteristics of the configuration employing the matrix converter, initially, an energy storage element such as a smoothing capacitor necessary in a DC portion is not required because power conversion is performed without the DC portion.

Secondly, as compared with an example in which AC is once converted to DC by the inverter and the resultant DC is converted to AC by another inverter, a size of individual switching element can be made smaller, in spite of increase in the number of switching elements. As a whole, a power supply system for a vehicle with a small size and a large capacity can be obtained.

Though detailed description is not provided, a variety of proposals have been made for PWM control of the 3×3 matrix converter. For example, the paper by Patrick W. Wheeler et al. introduces PWM control.

Matrix converter 38 converts the three-phase AC power input from motor-generator MG1 directly to the three-phase AC power for driving motor-generator MG2 and outputs the resultant three-phase AC power, without rectifying the three-phase AC power generated by motor-generator MG1 once to DC as in an example using a conventional three-phase full-wave rectification inverter.

When the power generated by motor-generator MG1 is transmitted to motor-generator MG2, control unit 40 sets switch SI to a disconnected state.

When the power from battery 12 and the power generated by motor-generator MG1 are both used to drive motor-generator MG2, an ON state and an OFF state of switch S1 are controlled in a time-division manner.

At the moment when the power generated by motor-generator MG1 is transmitted to motor-generator MG2, switch S1 is controlled to attain the OFF state and an operation of inverter 36 is controlled to attain a stopped state. Then, the switching element inside matrix converter 38 is subjected to appropriate PWM control, so that the power for driving motor-generator MG2 can be generated.

On the other hand, at the moment when the power is transmitted from battery 12 to the motor-generator, switch S1 is controlled to attain the ON state, and the DC power output from battery 12 is boosted by booster unit 32 and converted to the three-phase AC power by inverter 36, which is in turn used for driving motor-generator MG2. Here, the switching elements in matrix converter 38 are all controlled to attain the OFF state.

In power supply system for a vehicle 14, transmission and reception of the three-phase AC power between two motor-generators MG1 and MG2 can be performed more directly by means of matrix converter 38. Therefore, power loss can be reduced as compared with a conventional example in which the three-phase AC power is once converted to DC.

FIGS. 3 to 6 are circuit diagrams showing examples of the switching element used in the matrix converter.

Figure 3:
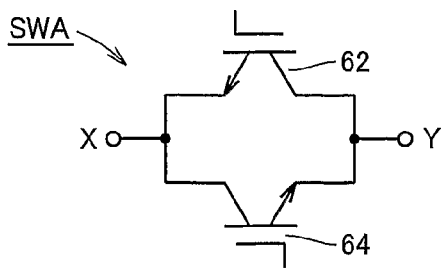
FIG. 3 is a circuit diagram showing a first example of a switching element used in a matrix converter.

Referring to FIG. 3, a switching element SWA includes an IGBT element 62 having the emitter connected a terminal X and the collector connected to a terminal Y and an IGBT element 64 having the emitter connected terminal Y and the collector connected to terminal X. IGBT elements 62, 64 both represent IGBT elements with a reverse blocking function. The IGBT element with a reverse blocking function has a withstand voltage sufficient to withstand application of a reverse voltage thereto, and has attracted much attention recently.

Switching element SWA shown in FIG. 3 is used as switching elements SAa to SAc, SBa to SBc and SCa to SCc in FIG. 2. Control unit 40 controls IGBT elements 62, 64 such that they attain an electrically connected state by activating the gates of IGBT elements 62, 64. If terminal Y attains a voltage higher than terminal X, the current flows through IGBT element 62. Though a reverse voltage is applied to IGBT element 64, the current does not flow through IGBT element 64 because it is a reverse blocking type IGBT.

On the other hand, if terminal X attains a voltage higher than terminal Y, the current flows through IGBT element 64. Though a reverse voltage is applied to IGBT element 62, the current does not flow through IGBT element 62 because it is a reverse blocking type IGBT. In this manner, switching element SWA operates as the bidirectional switching element.

Figure 4:
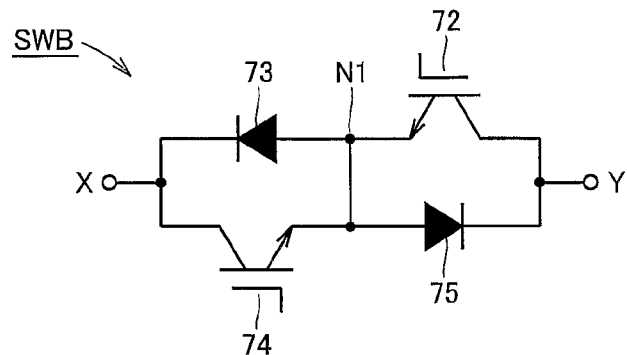
FIG. 4 is a circuit diagram of a switching element SWB representing a second example of the switching element.

FIG. 4 is a circuit diagram of a switching element SWB representing a second example of the switching element.

Referring to FIG. 4, switching element SWB includes an IGBT element 72 having the emitter connected to a node N1 and the collector connected to terminal Y, a diode 73 connected between node N1 and terminal X such that a direction from node N1 to terminal X is a forward direction, an IGBT element 74 having the collector connected to terminal X and the emitter connected to node N1, and a diode 75 connected between node N1 and terminal Y such that a direction from node N1 to terminal Y is a forward direction.

Switching element SWB can allow bidirectional flow of the current when the gates of IGBT elements 72, 74 are both activated.

That is, if terminal Y attains a voltage higher than terminal X, the current flows from terminal Y to terminal X through IGBT element 72 and diode 73. On the other hand, if terminal X attains a voltage higher than terminal Y, the current flows from terminal X to terminal Y through IGBT element 74 and diode 75.

As diodes 73 and 75 are included in this configuration, IGBT elements 72, 74 do not have to be the IGBT elements with the reverse blocking function as shown in FIG. 3. When the IGBT element with the reverse blocking function is not used, a reverse current cannot be blocked even if the gate is inactivated during a period in which the reverse voltage is applied to opposing ends.

Meanwhile, if terminal Y attains a voltage higher than terminal X, a forward voltage is applied to IGBT element 72. Therefore, when the gate of IGBT element 72 is inactive, the current does not flow through IGBT element 72. In addition, as the reverse voltage is applied to diode 75, the current does not flow therethrough. Therefore, the current from terminal Y to node N1 can be blocked.

On the other hand, if terminal X attains a voltage higher than terminal Y, the forward voltage is applied to IGBT element 74. Therefore, when the gate of IGBT element 74 is inactive, the current does not flow through IGBT element 74. In addition, as the reverse voltage is applied to diode 73, the current does not flow therethrough. Therefore, the current from terminal X to node N1 can be blocked.

As described above, switching element SWB can be employed as the bidirectional switch.

Figure 5:
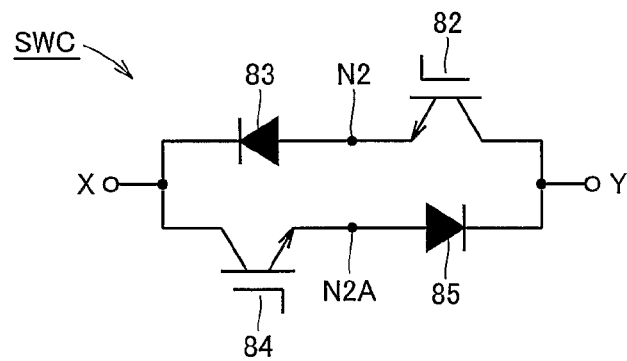
FIG. 5 illustrates a configuration of a switching element SWC representing a third example of the switching element.

FIG. 5 is a circuit diagram showing a configuration of a switching element SWC representing a third example of the switching element.

Referring to FIG. 5, switching element SWC includes an IGBT element 82 having the collector connected to terminal Y and the emitter connected to a node N2, a diode 83 connected between node N2 and terminal X such that a direction from node N2 to terminal X is a forward direction, an IGBT element 84 having the emitter connected to a node N2A and the collector connected to terminal X, and a diode 85 connected between node N2A and terminal Y such that a direction from node N2A to terminal Y is a forward direction.

Switching element SWC can also be employed as the bidirectional switch, in a manner similar to switching element SWB shown in FIG. 4.

Figure 6:
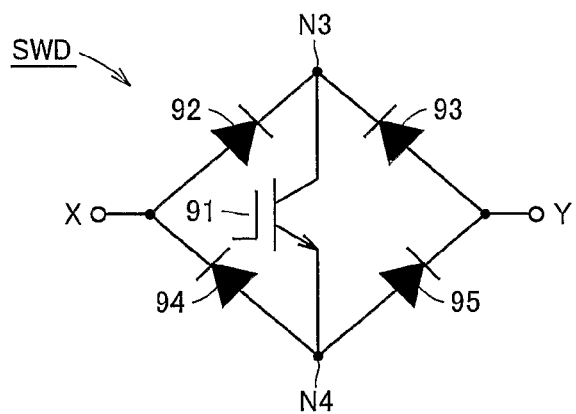
FIG. 6 is a circuit diagram showing a configuration of a switching element SWD representing a fourth example of the switching element.

FIG. 6 is a circuit diagram showing a configuration of a switching element SWD representing a fourth example of the switching element.

Referring to FIG. 6, switching element SWD includes a diode 92 connected between terminal X and a node N3 such that a direction from terminal X to node N3 is a forward direction and a diode 93 connected between terminal Y and node N3 such that a direction from terminal Y to node N3 is a forward direction.

Switching element SWD further includes a diode 94 connected between terminal X and a node N4 such that a direction from node N4 to terminal X is a forward direction, a diode 95 connected between terminal Y and node N4 such that a direction from node N4 to terminal Y is a forward direction, and an IGBT element 91 having the collector connected to node N3 and the emitter connected to node N4.

When the gate of IGBT element 91 is activated and if terminal X attains a potential higher than terminal Y, a path through which the current flows is formed sequentially by diode 92, IGBT element 91, and diode 95. On the other hand, if terminal Y attains a potential higher than terminal X, a path through which the current flows is formed sequentially by diode 93, IGBT element 91, and diode 94.

In the example above, the current always flows in a direction from node N3 to node N4. That is, the potential is always higher at node N3 than at node N4. Therefore, if the gate of IGBT element 91 is inactivated at that time, terminal X and terminal Y are electrically isolated from each other.

Matrix converter 38 according to the present invention can be implemented by any of the switching elements exemplarily shown in FIGS. 3 to 6. If the IGBT element with the reverse blocking function as shown in FIG. 3 is used, however, a diode is not present on a path through which the current flows. Therefore, such an example attains efficiency higher than an example in which another switching element is used, by an amount of heat loss caused in passing through the diode. Accordingly, the example shown in FIG. 3 is preferably used.

Figure 7:
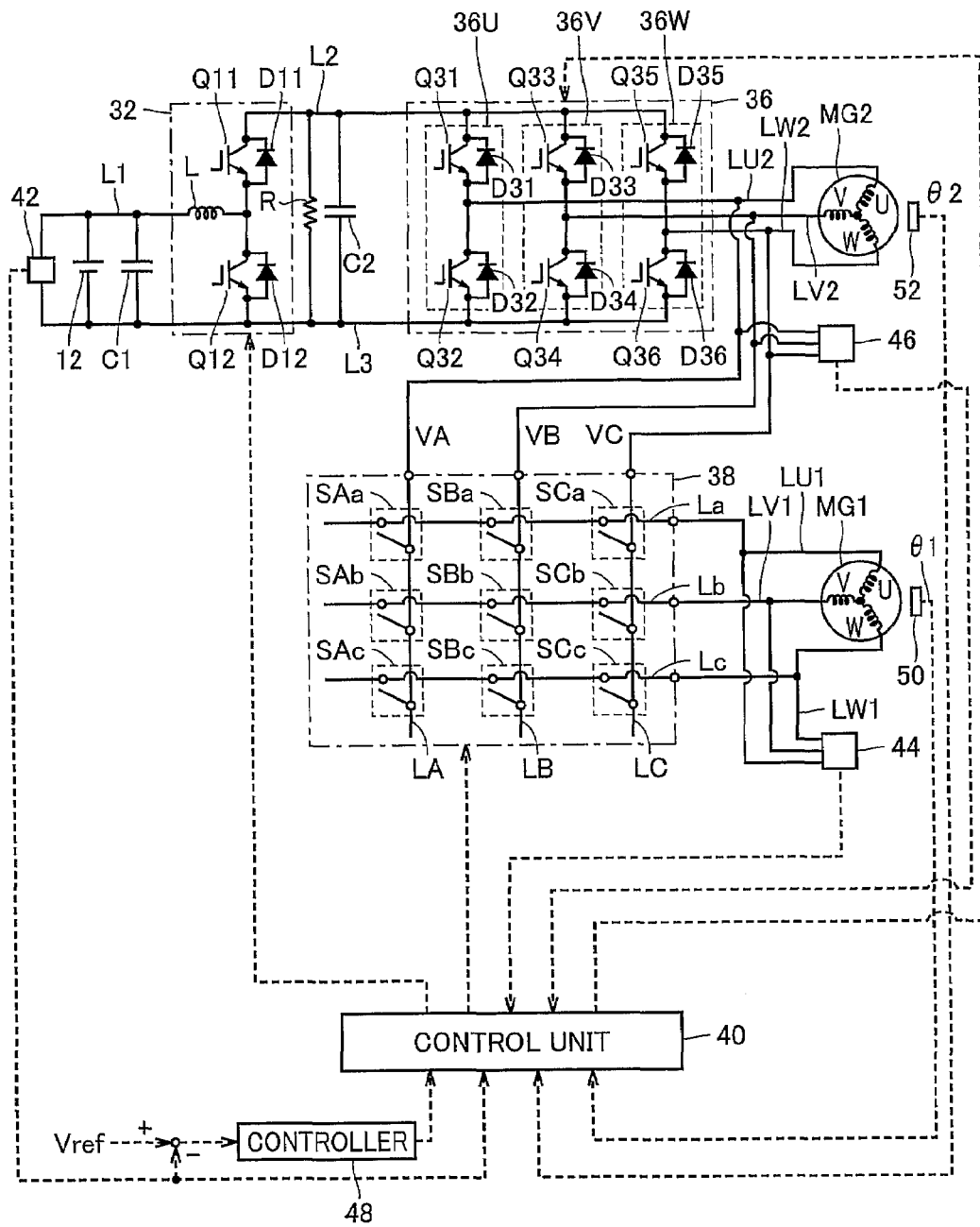
FIG. 7 is a circuit diagram showing a variation of the power supply system for a vehicle shown in FIG. 2.

FIG. 7 is a circuit diagram showing a variation of the power supply system for a vehicle shown in FIG. 2.

Referring to FIG. 7, a configuration of a power supply system for a vehicle 14A is different from that of power supply system for a vehicle 14 shown in FIG. 2 in that switch SI is removed and power supply line L4 is coupled to power supply line L2.

In this configuration, control unit 40 simultaneously subjects inverter 36 and matrix converter 38 to PWM control, in accordance with the power required in motor-generator MG2.

Under simultaneous PWM control, the power generated by motor-generator MG1 and output from matrix converter 38 is added to the power supplied from battery 12 and output from inverter 36, and the sum can be supplied to motor-generator MG2. Accordingly, when motor-generator MG2 attains its maximum output, load born by inverter 36 can be reduced. Here, the maximum output of motor-generator MG2 is attained, for example, when the vehicle runs at a high speed.

When the maximum output of motor-generator MG2 is set to 50 kW, for example, the maximum output of 50 kW has been necessary also in inverter 36 in the example of driving in a time-division manner as described in connection with FIG. 2.

In contrast, according to the configuration shown in FIG. 7, the power generated by motor-generator MG 1 can be added to the power from inverter 36, and the sum can be supplied to motor-generator MG2. Therefore, inverter 36 should only cover a shortfall of an amount of electric power generated by motor-generator MG1 at the time when motor-generator MG2 attains its maximum output. Therefore, as compared with the example shown in FIG. 2, the output of inverter 36 can be reduced from 50 kW to approximately 30 kW, for example.

Second Embodiment

Figure 8:
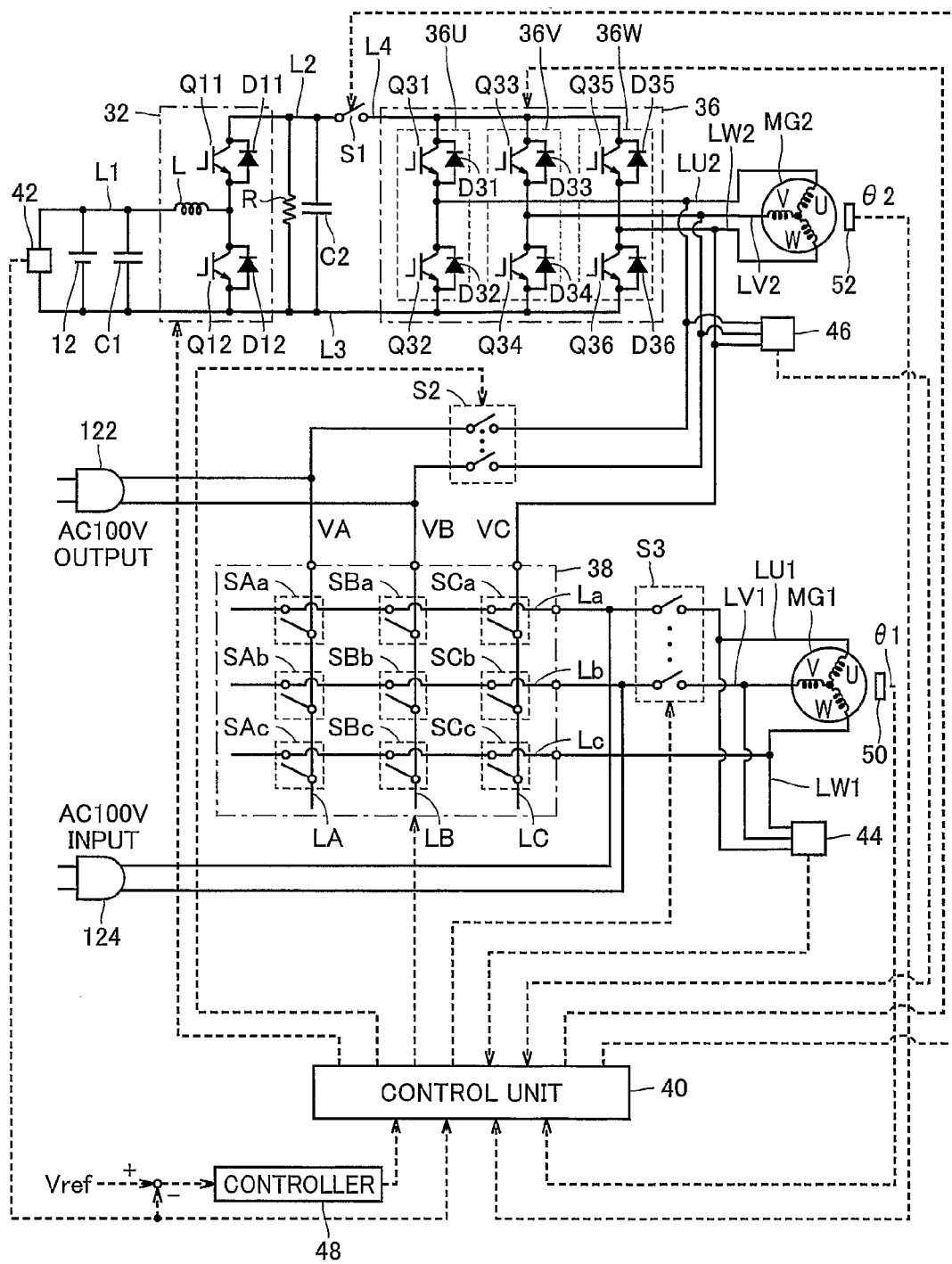
FIG. 8 is a circuit diagram showing a configuration of a power supply system for a vehicle 114 according to a second embodiment.
Figure 9:
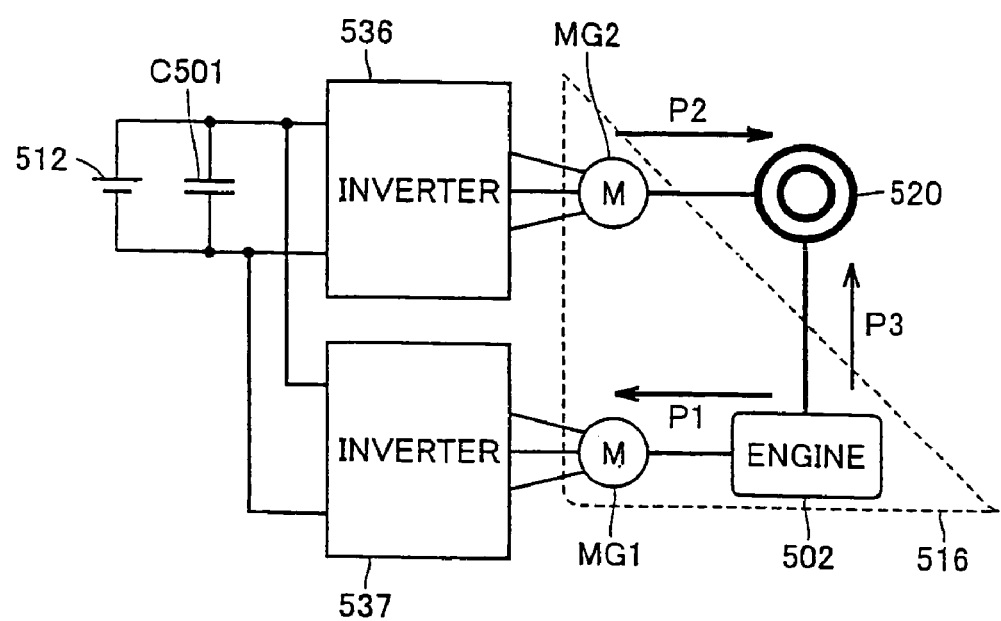
FIG. 9 illustrates energy transmission in a conventional hybrid vehicle.

FIG. 8 is a circuit diagram showing a configuration of a power supply system for a vehicle 114 according to a second embodiment.

Referring to FIG. 8, a configuration of power supply system for a vehicle 114 is different from that of power supply system for a vehicle 14 described in connection with FIG. 2 in that a switch S2 is provided between lines LU2, LV2 and lines LA, LB and an output socket 122 for AC 100V is connected between switch S2 and lines LA, LB.

In addition, a switch S3 is provided between lines LU1, LV1 and lines La, Lb and an input socket 124 for AC 100V is connected between switch S3 and lines LA, LB. These are differences between power supply system for a vehicle 114 in FIG. 8 and power supply system for a vehicle 14 in FIG. 2. Power supply system for a vehicle 114 is otherwise the same as power supply system for a vehicle 14, and description thereof will not be repeated.

Power supply system for a vehicle 114 can use the vehicle as a power station supplying commercial AC power from socket 122. Here, control unit 40 sets switches S1, S2 to the OFF state and sets switch S3 to the ON state. Then, the engine is started and electric power is generated by motor-generator MG1. Generated three-phase AC is converted to single-phase AC 100V by matrix converter 38. Here, control unit 40 sets switching elements SCa to SCc in matrix converter 38 to a disconnected state, and subjects switching elements SAa to SAc and SBa to SBc to PWM control.

In addition, power supply system for a vehicle 114 can also charge battery 12 mounted on the vehicle and supply power to an electrical system of the vehicle, using the commercial power supply of AC 100V. Here, control unit 40 sets switch S3 to the OFF state and sets switches S1, S2 to the ON state.

Thereafter, matrix converter 38 once converts the commercial power supply AC 100V input from socket 124 to three-phase AC. Here, control unit 40 sets switching elements SAc, SBc and SCc in matrix converter 38 to a disconnected state, and subjects switching elements SAa to SAb, SBa to SBb and SCa to SCb to PWM control.

The three-phase AC converted by matrix converter 38 is converted to the DC voltage by inverter 36, and converted to a voltage suitable for charging battery 12 by booster unit 32.

As described above, according to the second embodiment, in addition to the effect achieved by the first embodiment, the commercial power supply can be taken out from the vehicle and the on-vehicle battery can be charged by input of the commercial power supply to the vehicle.

In addition, according to the second embodiment, a dedicated inverter to output the commercial AC voltage is not necessary, or the reactor or the capacitor that has conventionally been included in the AC-AC converter is not necessary. Therefore, the hybrid vehicle can be reduced in size.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A power supply system for a vehicle, comprising:
a first rotating electric machine capable of generating first m-phase AC power upon receiving mechanical power from an internal combustion engine, where m represents a natural number which is at least 3;
a second rotating electric machine driving a wheel upon receiving second m-phase AC power equal to said first m-phase AC power in number of phases;
a matrix converter converting said first m-phase AC power and outputting resultant AC power as at least a portion of said second m-phase AC power, said matrix converter including m×m switching elements connected between each of m-phase outputs of said first rotating electric machine and each of m-phase inputs of said second rotating electric machine;
a battery;
an inverter converting DC power obtained from said battery and outputting resultant power as at least a portion of said second m-phase AC power;
a first switch electrically connecting said battery to said inverter; and
a control unit controlling power conversion by said matrix converter and controlling opening and closing of said first switch in association with a state of power conversion by said matrix converter.

2. The power supply system for a vehicle according to claim 1, wherein
said switching element includes a reverse-blocking-type insulated gate bipolar transistor.

3. The power supply system for a vehicle according to claim 1, further comprising:
a second switch electrically connecting said matrix converter to said second rotating electric machine; and
a socket connected between said second switch and said matrix converter and outputting single-phase AC power.

4. The power supply system for a vehicle according to claim 1, further comprising
a third switch electrically connecting said matrix converter to said first rotating electric machine; and
a socket connected between said third switch and said matrix converter and receiving single-phase AC power from outside of the vehicle.

5. A vehicle comprising a power supply system for a vehicle, wherein
said power supply system for a vehicle includes:
a first rotating electric machine capable of generating first m-phase AC power upon receiving mechanical power from an internal combustion engine, where m-phase represents a natural number which is at least 3,
a second rotating electric machine driving a wheel upon receiving second m phase AC power equal to said first m-phase AC power in number of phases, and
a matrix converter converting said first m-phase AC power and outputting resultant AC power as at least a portion of said second m-phase AC power,
said matrix converter includes m×m switching elements connected between each of m-phase outputs of said first rotating electric machine and each of m-phase inputs of said second rotating electric machine, and
said vehicle further includes
a battery;
an inverter converting DC power obtained from said battery and outputting resultant power as at least a portion of said second m-phase AC power;
a first switch electrically connecting said battery to said inverter; and
a control unit controlling power conversion by said matrix converter and controlling opening and closing of said first switch in association with a state of power conversion by said matrix converter.

6. The vehicle according to claim 5, wherein said switching element includes a reverse-blocking-type insulated gate bipolar transistor.

7. The vehicle according to claim 5, further comprising:
a second switch electrically connecting said matrix converter to said second rotating electric machine; and
a socket connected between said second switch and said matrix converter and outputting single-phase AC power.

8. The vehicle according to claim 5, further comprising:
a third switch electrically connecting said matrix converter to said first rotating electric machine; and
a socket connected between said third switch and said matrix converter and receiving single-phase AC power from outside of the vehicle.

9. A power supply system for a vehicle, comprising:
a first rotating electric machine capable of generating first m-phase AC power upon receiving mechanical power from an internal combustion engine, where m represents a natural number which is at least 3;
a second rotating electric machine driving a wheel upon receiving second m-phase AC power equal to said first m-phase AC power in number of phases;
a matrix converter converting said first m-phase AC power and outputting resultant AC power as at least a portion of said second m-phase AC power, said matrix converter including m×m switching elements connected between each of m-phase outputs of said first rotating electric machine and each of m-phase inputs of said second rotating electric machine;
a battery;
an inverter converting DC power obtained from said battery and outputting resultant power as at least a portion of said second m-phase AC power; and a control unit controlling power conversion by said matrix converter and controlling said inverter in association with a state of power conversion by said matrix converter.

10. The power supply system for a vehicle according to claim 9, wherein
said switching element includes a reverse-blocking-type insulated gate bipolar transistor.

11. The power supply system for a vehicle according to claim 9, further comprising:
a second switch electrically connecting said matrix converter to said second rotating electric machine; and
a socket connected between said second switch and said matrix converter and outputting single-phase AC power.

12. The power supply system for a vehicle according to claim 9, further comprising
a third switch electrically connecting said matrix converter to said first rotating electric machine; and
a socket connected between said third switch and said matrix converter and receiving single-phase AC power from outside of the vehicle.

13. A vehicle comprising a power supply system for a vehicle, wherein
said power supply system for a vehicle includes:
a first rotating electric machine capable of generating first m-phase AC power upon receiving mechanical power from an internal combustion engine, where m-phase represents a natural number which is at least 3,
a second rotating electric machine driving a wheel upon receiving second m phase AC power equal to said first m-phase AC power in number of phases, and
a matrix converter converting said first m-phase AC power and outputting resultant AC power as at least a portion of said second m-phase AC power,
said matrix converter includes m×m switching elements connected between each of m-phase outputs of said first rotating electric machine and each of m-phase inputs of said second rotating electric machine, and
said vehicle further includes
a battery;
an inverter converting DC power obtained from said battery and outputting resultant power as at least a portion of said second m-phase AC power; and
a control unit controlling power conversion by said matrix converter and controlling said inverter in association with a state of power conversion by said matrix converter.

14. The vehicle according to claim 13, wherein
said switching element includes a reverse-blocking-type insulated gate bipolar transistor.

15. The vehicle according to claim 13, further comprising:
a second switch electrically connecting said matrix converter to said second rotating electric machine; and
a socket connected between said second switch and said matrix converter and outputting single-phase AC power.

16. The vehicle according to claim 13, further comprising
a third switch electrically connecting said matrix converter to said first rotating electric machine; and
a socket connected between said third switch and said matrix converter and receiving single-phase AC power from outside of the vehicle.

* * * * *